Dec. 23, 1952  E. BACON  2,622,354
VEHICLE ACTUATED STOCK GUARD AND GATE
Filed July 29, 1949  2 SHEETS—SHEET 1
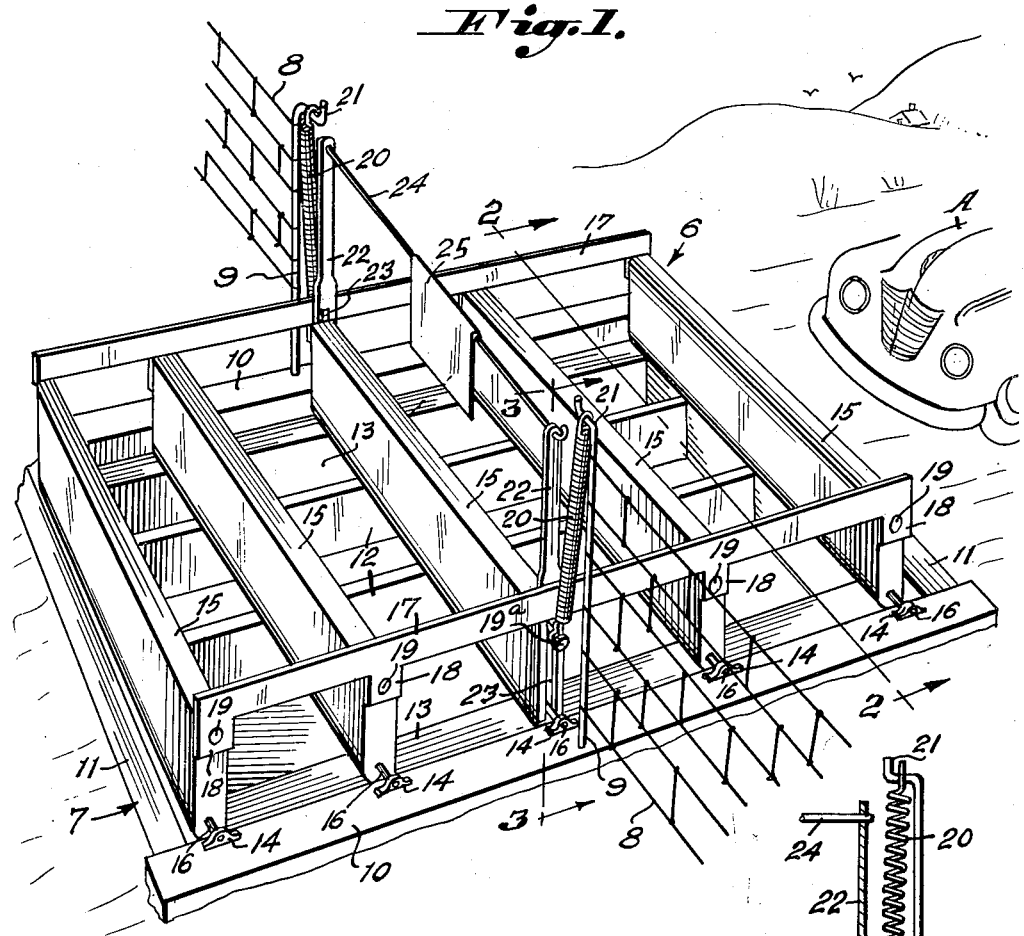
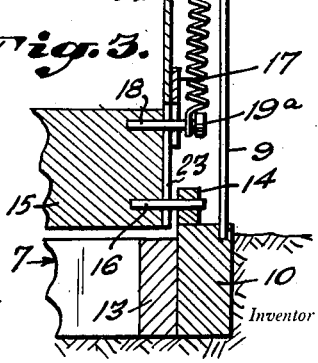
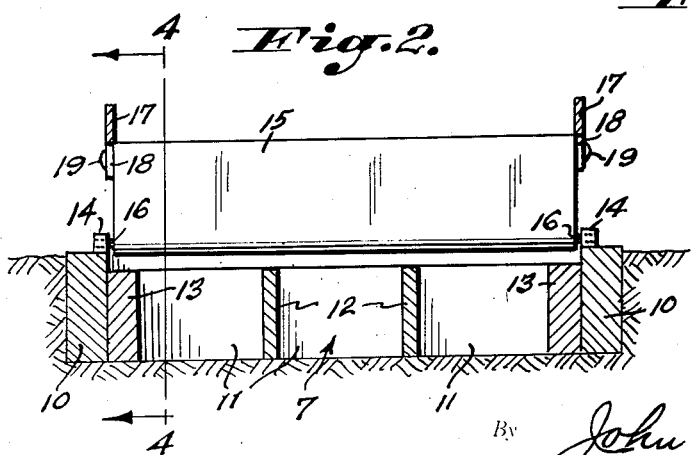
Inventor
Ernest Bacon
By John N. Randolph
Attorney Dec. 23, 1952         E. BACON         2,622,354
VEHICLE ACTUATED STOCK GUARD AND GATE
Filed July 29, 1949         2 SHEETS—SHEET 2
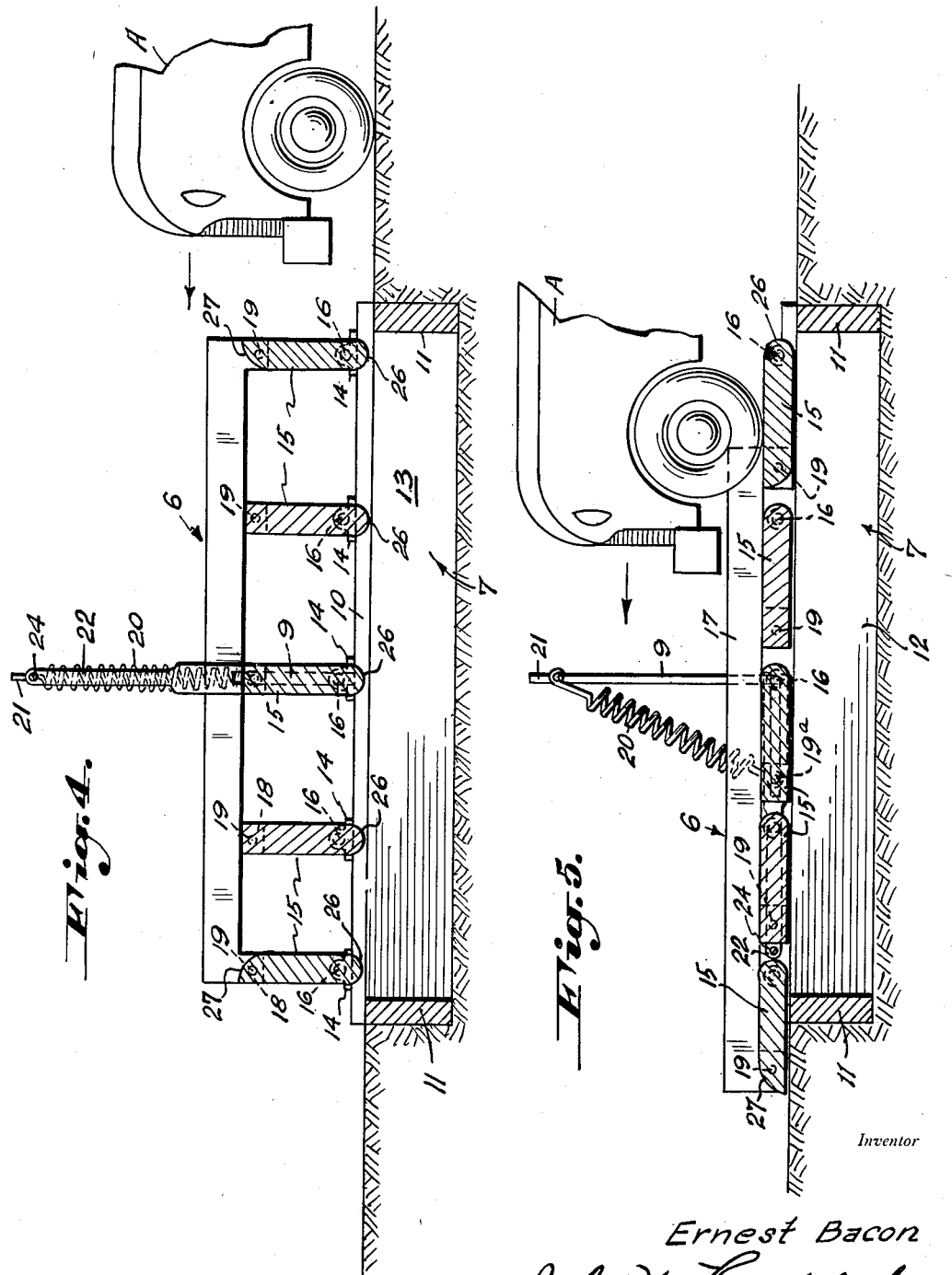
Inventor
Ernest Bacon
By John N. Randolph
Attorney Patented Dec. 23, 1952

2,622,354

UNITED STATES PATENT OFFICE 2,622,354

VEHICLE ACTUATED STOCK GUARD AND GATE

Ernest Bacon, Marmarth, N. Dak.

Application July 29, 1949, Serial No. 107,602

1 Claim. (Cl. 39—6)

This invention relates to a novel construction of stock guard adapted to be disposed in a fence opening and which will effectively function to prevent animals from passing through the fence opening yet which is adapted to be actuated by the engagement therewith of a vehicle for causing the stock guard to assume a position to provide a flooring over which the vehicle can readily pass through the fence opening, thereby eliminating the need of the driver of a vehicle getting out of the vehicle to open a gate for passing through a fence or enclosure opening and being thereafter required to again dismount from the vehicle to close the gate or other closure.

Still a further object of the invention is to provide a vehicle actuated stock guard which will promptly resume a position to prevent livestock from passing through the fence opening when disengaged by a vehicle.

Still a further object of the invention is to provide a vehicle actuated stock guard for fence or enclosure openings including an upright gate which is movable to a horizontal position when another portion of the guard is engaged by a vehicle to permit the vehicle to readily pass thereover and which thereafter resumes an upright position automatically to afford additional means for deterring livestock attempting to pass through the enclosure opening and which in addition affords a visual warning to drivers of approaching vehicles to approach the stock guard with care.

Numerous other objects and advantages of the invention will hereinafter become more fully apparent from the following description of the drawings, illustrating a preferred embodiment of the invention, and wherein:

Figure 1 is a perspective view showing the vehicle actuated stock guard positioned in a fence or enclosure opening and in its normal position for preventing the passage therethrough of livestock;

Figure 2 is a cross sectional view thereof taken substantially along a plane as indicated by the line 2—2 of Figure 1;

Figure 3 is a fragmentary transverse vertical sectional view taken substantially along a plane as indicated by the line 3—3 of Figure 1;

Figure 4 is a longitudinal sectional view of the stock guard taken substantially along a plane as indicated by the line 4—4 of Figure 2, and Figure 5 is a view similar to Figure 4 but showing the stock guard as it will appear when engaged by a vehicle to afford a platform or floor surface over which the vehicle can readily pass through the enclosure opening.

Referring more specifically to the drawings, the novel vehicle actuated stock guard in its entirety is designated generally 6 and includes an elongated rectangular frame, designated generally 7, which is adapted to be imbedded in the ground to extend through an opening in a fence or enclosure, adjacent ends of which fence or enclosure are indicated at 8. Said adjacent enclosure or fence ends 8 are supported by upright fence posts 9 which are anchored in and rise from side members 10 of the frame 7 which extend through the fence or enclosure opening defined by the posts 9. The frame 7 also includes imbedded end members 11 which are spaced from the fence or enclosure opening and which are disposed substantially parallel to the fence sections 8. A plurality of planks 12, constituting a part of the foundation 7, extend longitudinally between said end members 11 and are suitably secured at their ends thereto and are disposed on edge, as best illustrated in Figure 2. A thicker plank 13, likewise forming a part of the foundation 7 extends longitudinally of each side thereof, said planks 13 being secured to the inner sides of the side members 10 and likewise being disposed on edge. As clearly illustrated in Figure 2, the upper edges of the planks 13 are disposed at the same level as the upper edges of the planks 12 and below the level of the upper edges of the frame sides 10 but at the same level as the upper edges of the end members 11 of said frame.

The side members 10 have a plurality of longitudinally spaced bearing members 14 secured to the upper surfaces thereof and adjacent their inner sides and in longitudinally spaced relationship; said bearing members 14 being correspondingly arranged with respect to the two side members 10 so that complementary bearing members are in transverse alignment. One of the bearing members 14 of each frame side 10 is disposed substantially in alignment with the fence posts 9. The livestock guard 6 includes a plurality of combination tread and guard members 15 each of which has a pin 16 projecting from each end thereof. The pins 16 are journaled in transversely aligned bearing members 14 and are disposed in longitudinal alignment and adjacent one longitudinal edge of its tread member 15, which constitutes the bottom edge thereof when the tread member is in its normal position on edge, as illustrated in Figure 1. The tread members 15 are connected pivotally to one another adjacent their opposite, free edges by a pair of corresponding elongated links 17 which extend longitudinally of the frame 7 and which are provided with longitudinally spaced depending apertured ears or extensions 18 each of which is engaged by a headed pin 19 which extends inwardly therethrough and which is anchored in an end of one of the tread members 15 and adjacent its upper, free edge, so that said tread members 15 are linked together at each of their ends by the links 17. The center tread member 15 is provided with longer headed pins 19a which project outwardly from the ends thereof and to which are connected complementary, lower ends of contractile coiled springs 20 which extend upwardly therefrom. The posts 9 are provided with inwardly extending portions 21 adjacent their upper ends to which the upper ends of the springs 20 are anchored.

The vehicle actuated stock guard 6 also includes a pair of gate posts 22 the lower portions of which are provided with longitudinally extending slots 23 which open outwardly of the lower ends thereof and which engage the pins 19a of the center tread member 15 and the pivot pins 16 of said tread member. The gate posts 22 are illustrated as having a single strand of wire 24 extending between and secured to the upper ends thereof but it will be readily apparent that one or more additional strands of wire could extend between the gate posts 22. The strand 24 preferably supports a strip of material or flag 25 which may be colored red or of any other readily visible color so that drivers of approaching vehicles will see the stock guard 6 in sufficient time to approach it with care and at a slow speed.

Assuming that the stock guard is in its normal position as illustrated in Figures 1 to 4 for closing the opening between the fence posts 9, it will be readily apparent that the treads or guard members 15 when disposed in normal positions on edge and crosswise to the planks 12 will afford an obstruction which will effectively prevent cattle or other livestock from passing through the fence opening and the gate 22, 24 will provide an additional obstruction for livestock. However, when a motor vehicle approaches the guard 6 from either direction either its bumper or the front wheels of the vehicle, the forward part of which is illustrated in Figures 1, 4 and 5 and designated A will strike the tread member 15 at the end of the guard 6 that the vehicle is approaching and will push said tread member toward the opposite end of the guard for swinging it downwardly on its journals 14, 16 from its upright position of Figure 4 to its horizontal position of Figure 5 as the front wheels of the vehicle roll onto said first tread member 15. As the tread members 15 are all connected together by the links 17, the remaining tread members 15 will likewise be swung downwardly simultaneously with said first tread member to provide a floor or platform surface as seen in Figure 5 over which the vehicle A can readily pass from end-to-end of the guard 6 and through the fence or enclosure opening. Likewise, as the tread members 15 are swung downwardly the gate posts 22 which are connected to the upper and lower pins 19a and 16, respectively, of the center tread member 15 will also swing downwardly to a horizontal position and with the gate strand 24 positioned between two of said tread members 15, as seen in Figure 5 so that the gate will not interfere with the movement of the vehicle through the fence opening. When the tread members 15 are thus swung downwardly the pins 19a to which the springs 20 are connected will be swung downwardly and away from the upper portions of the posts 9 for tensioning the springs 20, as seen in Figure 5, so that after the vehicle has passed off of the tread member 15 at the opposite end of the guard (the left hand end as seen in Figures 1, 4 and 5) the springs 20 will return the guard to its normal, closed position of Figures 1 to 4. The tread members 15 are rounded as seen at 26 at the edges thereof disposed adjacent the pivot pins 16 so that the front wheels of the vehicle A may readily ride onto the tread member at the approach end of the guard 6 and the end tread members 15 are preferably rounded as seen at 27 on the sides thereof which face inwardly, when the tread members are in normal upwardly extending positions, as seen in Figure 4, so that the rear wheels of the vehicle A may readily roll off of the end tread members in passing over the guard 6 in either direction. The upper edges of the end walls 11 and planks 12 and 13 are disposed below the level of the upper edges of the frame sides 10 to provide supporting surfaces for the free ends of the tread members 15, when disposed in horizontal positions as seen in Figure 5, so that the weight of the vehicle will be supported by said frame members 11, 12 and 13.

Various modifications and changes are contemplated and may obviously be resorted to, without departing from the spirit or scope of the invention as hereinafter defined by the appended claim.

I claim as my invention:

A vehicle actuated stock guard comprising a pair of upright fence posts defining a gate opening therebetween, a frame embedded in the ground between the fence posts including spaced substantially parallel side members extending between the fence posts, a plurality of tread members supported by the frame and disposed crosswise of the frame and of said frame side members, journal means pivotally connecting the tread members at the ends thereof to said side members and along axes disposed adjacent corresponding longitudinal edges of the tread members, links extending longitudinally of the frame and pivotally connected to the ends of the tread members adjacent the opposite longitudinal edges of the tread members whereby the tread members are swingable as a unit on the frame, the pivot axis of the journal means of one of the tread members being disposed in alignment with the fence posts, tensioned pull springs having lower ends connected to said tread member and upper ends secured to the fence posts for yieldably supporting the tread members in vertical planes, said tread members being spaced apart to provide a platform when the tread members are swung in either direction to horizontal positions, a gate having gate posts secured to the ends of said tread member and extending upwardly from the last mentioned longitudinal edge thereof when the tread members are disposed in vertical planes, and a barrier extending between and secured to portions of the gate posts disposed remote to said tread member and normally disposed thereabove and spaced therefrom a distance whereby said barrier assumes a nested position between adjacent longitudinal edges of two other tread members when the tread members and gate are disposed in horizontal positions.

ERNEST BACON.

REFERENCES CITED

The following references are of record in the file of this patent:

UNITED STATES PATENTS

| Number | Name | Date |
|---|---|---|
| 1,186,273 | Brian | June 6, 1916 |
| 1,370,689 | Hearn | Mar. 8, 1921 |
| 1,569,235 | Plunkett | Jan. 12, 1926 |
| 2,256,662 | Blaker | Sept. 23, 1941 |